US011323387B2

(12) United States Patent
Abdulla et al.

(10) Patent No.: US 11,323,387 B2
(45) Date of Patent: May 3, 2022

(54) PRIORITIZED COMMUNICATION SESSION ESTABLISHMENT IN COMPUTER NETWORKS

(71) Applicant: Juniper Networks, Inc., Sunnyvale, CA (US)

(72) Inventors: Abdul Zubaidhar Abdulla, Bangalore (IN); Abhishek Asthana, Bangalore (IN); Jai Hari M K, Bangalore (IN)

(73) Assignee: Juniper, Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/917,439

(22) Filed: Jun. 30, 2020

(65) Prior Publication Data
US 2021/0359956 A1    Nov. 18, 2021

(30) Foreign Application Priority Data
May 18, 2020    (IN) .............................. 202041020834

(51) Int. Cl.
*H04L 12/28*    (2006.01)
*H04L 47/70*    (2022.01)
*H04L 45/50*    (2022.01)
*H04L 47/6275*    (2022.01)
*H04L 47/6295*    (2022.01)

(52) U.S. Cl.
CPC .......... *H04L 47/821* (2013.01); *H04L 45/507* (2013.01); *H04L 47/6275* (2013.01); *H04L 47/6295* (2013.01)

(58) Field of Classification Search
CPC . H04L 47/821; H04L 45/507; H04L 47/6275; H04L 29/06
See application file for complete search history.

(56) References Cited

U.S. PATENT DOCUMENTS

| 7,894,461 | B2 * | 2/2011 | Pei .......................... H04L 45/56 370/401 |
| 8,327,002 | B1 * | 12/2012 | Van Dussen ............ H04L 41/00 709/228 |
| 2006/0133390 | A1 * | 6/2006 | Sreekantiah ............ H04L 45/02 370/401 |

(Continued)

OTHER PUBLICATIONS

Extended Search Report from counterpart European Application No. 20196995.3, dated Feb. 8, 2021, 8 pp.

*Primary Examiner* — Abdelnabi O Musa
(74) *Attorney, Agent, or Firm* — Shumaker & Sieffert, P.A.

(57) ABSTRACT

Techniques are described for prioritized establishment of communication sessions. In one example, a network device parses a configuration file that defines a plurality of communication sessions of a routing protocol and includes priority values assigned to the communication sessions. The network device creates two or more lists of communication sessions for two or more of the priority values based on the configuration file, wherein each list of the two or more lists is created for a particular priority value of the priority values and defines one or more communication sessions of the plurality of communication sessions that are assigned the particular priority value. The network device then establishes the one or more communication sessions included in each list of the two or more lists according to an ordering based on the priority values associated with the two or more lists.

20 Claims, 5 Drawing Sheets

(56) References Cited

U.S. PATENT DOCUMENTS

| | | | |
|---|---|---|---|
| 2014/0040483 A1* | 2/2014 | Van Dussen | G06F 15/16 |
| | | | 709/227 |
| 2018/0234337 A1* | 8/2018 | Goliya | H04L 45/58 |
| 2018/0351864 A1* | 12/2018 | Jeganathan | H04L 45/586 |
| 2019/0245784 A1* | 8/2019 | Dhaliwal | H04L 67/14 |

* cited by examiner

PRIORITIZED COMMUNICATION SESSION ESTABLISHMENT IN COMPUTER NETWORKS

This application claims the benefit of IN Provisional Application No. 202041020834 filed May 18, 2020, the entire content of which is herein incorporated by reference.

TECHNICAL FIELD

The disclosure relates to networking technologies, including computer networks and network devices.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Intermediate devices (referred to as network devices or nodes) are interconnected so as to provide an infrastructure for forwarding the packets between computing devices. For example, computer networks may include routers, switches, gateways, firewalls and a variety of other network devices.

At a network device, an operating system implements a number of components/features that configure hardware/software resources within the network device to operate as a router, a switch, a gateway, or the like. The operating system configures routing and forwarding of the packets, for example, by invoking a number of routing protocols. There are instances when the network device must rely upon the operating system to reconfigure the network device for the routing and forwarding of the packets.

SUMMARY

In general, the disclosure describes techniques for efficient and prioritized communication session establishment in computer networks. For example, the disclosed techniques allow administrators to assign priority values to communication sessions defined within a current configuration file for a particular routing protocol at the network device. The current configuration file generally defines communication sessions and other relationships between the network device and other network devices within the computer network. The configuration file may be used to establish a group of communication sessions initially and/or to reestablish the group of communication sessions upon restart of the network device after, e.g., an unplanned outage or a planned upgrade. When the network device restarts, in accordance with the disclosed techniques, the network device creates different data structures or lists of the communication sessions based on the priority values and reestablishes the communication sessions defined in each of the lists for the particular routing protocol according to an establishment order based on the priority values associated with the lists.

The techniques described in this disclosure include command line interface (CLI) components (referred to as "knobs") that the administrator may use to assign a priority value to each of the communication sessions defined in the configuration file. A dedicated CLI knob may be used for each routing protocol supported by the network device to specify priority values of communication sessions of the routing protocol.

There are a number of inefficiencies present in current communication session reestablishment techniques. The prioritized communication session establishment techniques described herein either eliminate or at least mitigate the inefficiencies. To illustrate by way of example, when an example network device such as an edge router undergoes a restart, due to an outage or an upgrade, current techniques consume computing resources to reestablish sessions for a particular routing protocol without considering negative effects from such consumption (e.g., system slowdown, traffic loss, and/or the like) with respect to customer-based prioritization for services. The negative effects may stem from the network device attempting to reestablish all of the communication sessions with no ordering scheme or based on an order in which the communication sessions where originally configured (i.e., configuration order).

In general, the techniques described herein prevent or mitigate these negative effects by controlling an ordering in which the communication sessions are reestablished. By assigning priority values to the communication sessions, the techniques described herein may sort the communication sessions according to the priority values and identify the communication sessions having a highest priority in order to reestablish them before communication sessions having a lower priority. A CLI knob as described herein may be implemented by the network device to enable the assignment of priority values to the communication sessions defined within a configuration file. Examples of such communication sessions include BGP peering sessions and RSVP-signaling sessions but are not limited to any particular session type or protocol. BGP and RSVP are examples of protocols that are compatible with the techniques described herein. In fact, the techniques described herein are applicable to a variety of protocols including routing protocols other than BGP and RSVP. Other protocols can be Open Shortest Path First (OSPF), Intermediate System-Intermediate System (ISIS), Label Distribution Protocol (LDP), Protocol-Independent Multicast (PIM), and/or the like.

In one example, a method includes parsing, by a network device, a configuration file defining a plurality of communication sessions of a routing protocol and including priority values assigned to the communication sessions; creating, by the network device, two or more lists of communication sessions for two or more of the priority values based on the configuration file, wherein each list of the two or more lists is created for a particular priority value of the priority values and defines one or more communication sessions of the plurality of communication sessions that are assigned the particular priority value; and establishing, by the network device, the one or more communication sessions defined in each list of the two or more lists according to an ordering based on the priority values associated with the two or more lists.

In another example, a network device includes processing circuitry configured to parse a configuration file that defines a plurality of communication sessions of a routing protocol and includes priority values assigned to the communication sessions. The network device creates two or more lists of communication sessions for two or more of the priority values based on the configuration file, wherein each list of the two or more lists is created for a particular priority value of the priority values and defines one or more communication sessions of the plurality of communication sessions that are assigned the particular priority value. The network device then establishes the one or more communication sessions included in each list of the two or more lists according to an ordering based on the priority values associated with the two or more lists.

In another example, a computer-readable medium having instructions for causing a programmable processor to: parse a configuration file defining a plurality of communication sessions of a routing protocol and including priority values assigned to the communication sessions; create two or more lists of communication sessions for two or more of the priority values based on the configuration file, wherein each list of the two or more lists is created for a particular priority value of the priority values and defines one or more communication sessions of the plurality of communication sessions that are assigned the particular priority value; and establish the one or more communication sessions defined in each list of the two or more lists according to an ordering based on the priority values associated with the two or more lists.

The details of one or more examples are set forth in the accompanying drawings and the description below. Other features, objects, and advantages will be apparent from the description and drawings, and from the claims.

DETAILED DESCRIPTION

Figure 1:
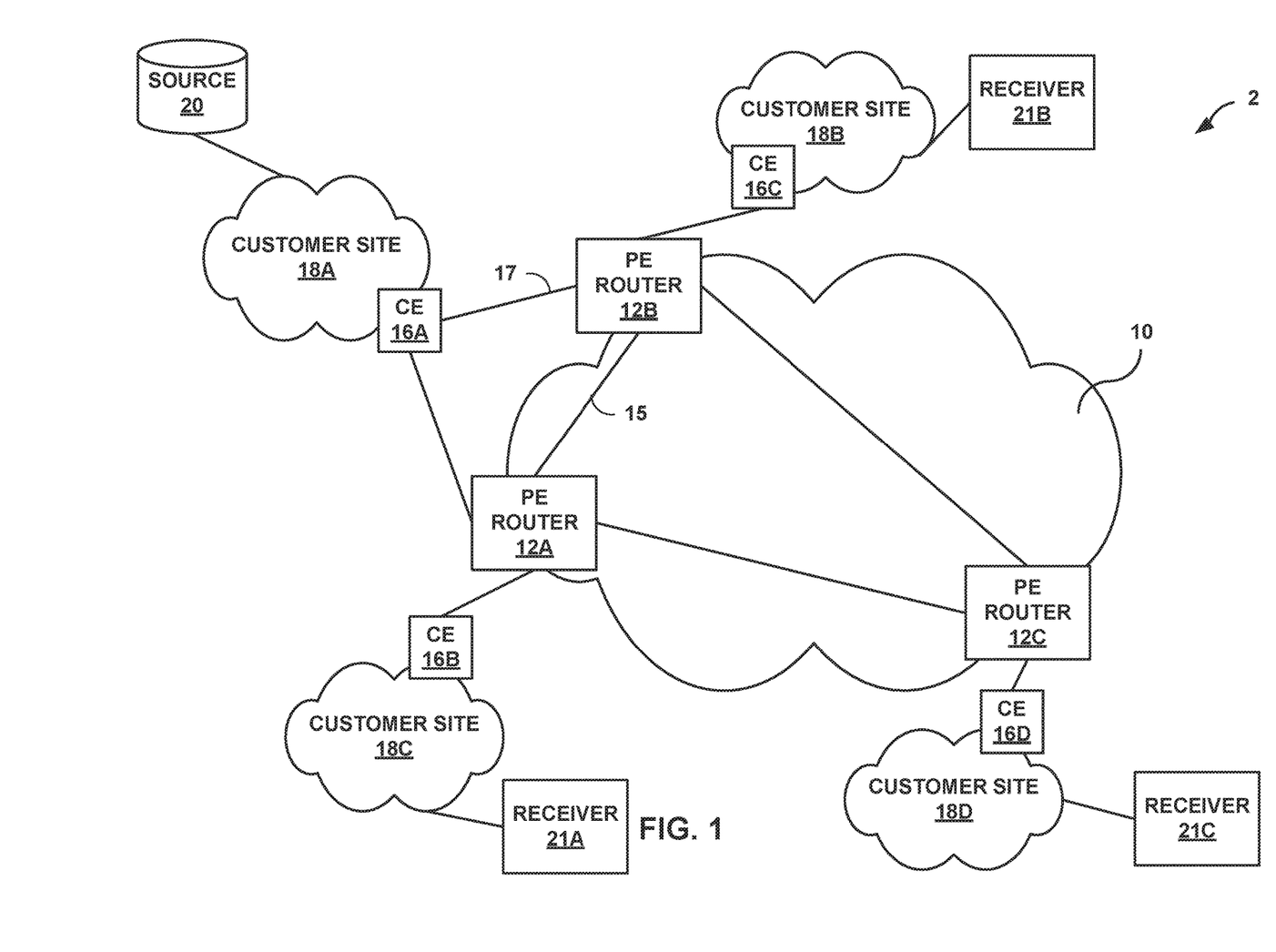
FIG. 1 is a block diagram illustrating an example system that operates in accordance with various aspects of the techniques described in this disclosure.

FIG. 1 is a block diagram illustrating an example system 2 that operates in accordance with various aspects of the techniques described in this disclosure. In example system 2, provider edge (PE) routers 12A-12C ("PE routers 12") are configured to prioritize session establishment for at least one customer in accordance with the techniques of this disclosure. System 2 includes an example computer network 10 in which PE routers 12 support a network to provide network service and manage traffic between source 20 and receivers 21 associated with customer sites 18A-18D ("customer sites 18"). Each of PE routers 12 couples to one or more customer sites 18 via customer edge (CE) routers 16A-16D ("CE routers 16"). In some examples, network 10 is referred to as a "core" network, and interfaces of PE routers 12 that couple to another PE router 12 may be referred to as "core-facing" interfaces.

Computer network 10, for example, may include an enterprise network, a campus network, a service provider network, a home network, or another autonomous system. In any of these examples, remotely located source 20 and receivers 21A-21C ("receivers 21") within customer sites 18 may share data via computer network 10. As one example of network 10 as a service provider network, customer sites 18 are allocated varying service levels as captured in Service Level Agreements (SLAs). At least two of customer sites 18 may be separate customers that pay for different service levels: A first high priority customer site 18A is provided a larger resource allocation than a second low priority customer site 18B. The techniques described herein extend the customer's SLA to the reestablishment of communication sessions, for example, after a restart of one or more PE routers 12 within network 10. As demonstrated herein, current network devices bring up communication sessions in configuration order, which is an ordering that does not account for the SLAs actually paid for by customer sites 18. For example, when a current network device establishes communication sessions in a same ordering in which the sessions where originally configured, the high priority customer site 18A's communication sessions may be delayed, never established, or established with errors. In contrast, a network device in accordance with the techniques described herein establishes the communication sessions in priority order such that a paying customer of a highest QoS has their sessions established first.

As one example of network 10 as an enterprise network, each of customer sites 18 may comprise one or more servers or employee computer terminals located in different regions of a single office location. As another example of network 10 as an enterprise network, each of customer sites 18 may comprise a remote office location of a corporation such that enterprise network 10 may be extended across a public network, such as the Internet. Although illustrated in FIG. 1 as an enterprise network or a service provider network, the techniques of this disclosure are applicable to other network types, both public and private. Examples of other network types include local area networks (LANs), virtual local area networks (VLANs), virtual private networks (VPNs), and the like. In some examples, computer network 10 may be coupled to one or more additional private or public networks, e.g., the Internet. In other examples, computer network 10 may comprise the Internet or another public network. In some cases, computer network 10 may comprise a multi-protocol label switching (MPLS) network. In the illustrated example, computer network 10 includes PE routers 12. Although not illustrated, network 10 may include additional edge routers and/or core routers not shown.

Each of customer sites 18 may include a local area network (LAN) or a wide area network (WAN) that comprises a plurality of subscriber devices, such as desktop computers, laptops, workstations, PDAs, wireless devices, network-ready appliances, file servers, print servers or other devices. In some cases, customer sites 18 may be configured to support multicast traffic, such as Internet Protocol Television (IPTV), desktop conferences, corporate broadcasts, music and video web casts, and other forms of multimedia content.

In FIG. 1, PE router 12B receives/transmits packets as a destination/source or operates as an intermediary exchanging packets between network devices, for example, a local CE, such as CE router 16C, and another PE, such as PE router 12A. Each packet reception/transmission involves PE router 12B directing the packets along a path toward an appropriate destination. To enable such packet receptions/transmissions, PE router 12B configures its routing and forwarding components with information regarding computer network 10, such as information describing other routers as well as paths between PE router 12B and the other routers. Examples of such information include tables storing mappings between identifiers (e.g., names) and addresses (e.g., Media Access Control (MAC) addresses) for the other routers and the paths. PE router 12B processes such information to determine, for instance, which routers are neighbors/peers (e.g., BGP peers) and which paths (e.g., label switched paths (LSPs)) include PE router 12B and therefore, require computing time/resources from PE router 12B. PE router 12B runs communication sessions for a number of protocols to generate and then, propagate such information. As described herein, some example protocols include Border Gateway Protocol (BGP) and Resource Reservation Protocol (RSVP).

To illustrate by way of an example involving BGP, PE router 12B establishes BGP sessions with its neighbors to identify internal BGP neighbors (iBGP peers) such as PE router 12A where path 15 is referred to as an iBGP path 15, and eBGP neighbors (eBGP peers) such as CE router 16A where path 17 is referred to as an eBGP path 17.

To illustrate by way of an example involving RSVP, when PE router 12B receives a packet from a local CE router, for example, from CE router 16C, PE router 12B examines the possible LSPs toward the packet's destination that do not go through CE router 16C from which the packet was received. As the ingress router, PE router 12B initiates one or more RVSP-signaled LSPs by communicating signaling messages to intermediate router(s) and the egress router. PE router 12B stores configuration information recording device names and path names for each eBGP/iBGP peer and each RSVP-signaled LSP.

As described herein, PE router 12B prioritizes establishment of communication sessions such as BGP or RSVP sessions for high priority customers, for example, by enabling assignment of priorities to communication sessions for at least some of the customers. These priorities may correspond to a customer's expected quality of service as outlined in the customer's Service Level Agreement (SLA). To accomplish this prioritization, PE router 12B instantiates a number of CLI components (known as knobs) each of which being configured to receive a command indicating a new priority value to store in a configuration file or a value to increment/decrement a current priority value stored in the configuration file. Each knob may be configured to store a priority value for communication sessions of a specific protocol or session type. When an admin invokes through the CLI an example knob for assignment of a certain priority value to a corresponding communication session, PE router 12B receives the certain priority value and, in response, accesses the configuration file and identifies at least one configuration statement that defines the corresponding communication session. To properly and uniquely identify through the example knob the corresponding communication session to PE router 12B, the admin may provide a session parameter when invoking the example knob with the certain priority value. The at least one identified configuration statement generally defines parameters for the corresponding communication session and one or more parameters may match the admin provided session parameter. Upon accessing the at least one identified configuration statement, PE router 12B, on behalf of the example knob, stores the certain priority value (e.g., as a parameter value) in the at least one identified configuration statement.

A first knob may be invoked by an admin to adjust a priority value for a specific BGP peer or RSVP-signaled LSP. The CLI component may include software code that is executed as part of PE router 12B's operating system's CLI and given a representative command for an administrator to enter through the CLI. When the representative command is entered through the CLI, PE router 12B responds by adjusting (e.g., by one (1)) a priority value for a specific communication session. This adjustment may be negative or positive and also may move the specific communication session into a lower or higher priority classification. To illustrate by way of example, if the administrator enters the representative command including, as arguments, a RSVP-signaled LSP name and a quantity to increment/decrement, PE router 12B, in response, searches for the LSP name in the configuration file storing communication session configuration information and modifies the corresponding priority value of the LSP name.

The present disclosure describes a number of examples where knobs are leveraged to enable prioritized establishment of sessions. One example is the reconfiguration of a network device, such as PE router 12B. There are a number of circumstances where the prioritized establishment of sessions provides benefits to the reconfiguration. One circumstance prompting reconfiguration is a graceful restart event scheduled for PE router 12B after which PE router 12B prioritizes establishment of at least one session amongst the enumerated sessions defined in the above-mentioned configuration information. PE router 12B may sort the sessions according to priority value and identify one or more sessions having a highest priority value and one or more sessions having a lower or lowest priority value. Once identified, PE router 12B directs the establishment of the one or more identified sessions having the highest priority value before any other session. In this manner, the one or more sessions having the lower or lowest priority are not established (yet), preventing potential problems associated with their establishment. After confirming successful establishment of the highest priority sessions, PE router 12B resumes establishing the one or more sessions having the lower or lowest priority. As demonstrated herein, by prioritizing establishment of the sessions having the highest priority value, PE router 12B mitigates or completely avoids issues that often arise when the sessions are established in configuration order. When bringing up an excessive number of sessions causes a rush for resources and resource hogging, delaying establishment of one or more of these sessions may avoid or mitigate such resource hogging.

Some current techniques reestablish the routing protocol sessions in configuration order, which is done to recreate routing and forwarding data structures in a same arbitrary ordering at which the structures are stored in or read from a file when the communication sessions were originally established. In some scenarios, however, it may be desirable to prioritize the reestablishment of communication sessions associated with certain customers to avoid potential delays or errors that may result from an unplanned or planned reestablishment of the communication sessions. It is possible for the reestablishment of communication sessions to overwhelm a network device, for example, when a total number of sessions attempting to be reestablished at a same time consumes critical capacities of resources. As one preventive measure, PE router 12B may prioritize the establishment of sessions for higher priority customers first. Hence, PE router 12B controls an ordering at which session reestablishment is performed by assigning priorities to sessions that are described in the configuration file. In this manner, PE router 12B may identify one or more sessions to establish first before any other session.

Figure 2:
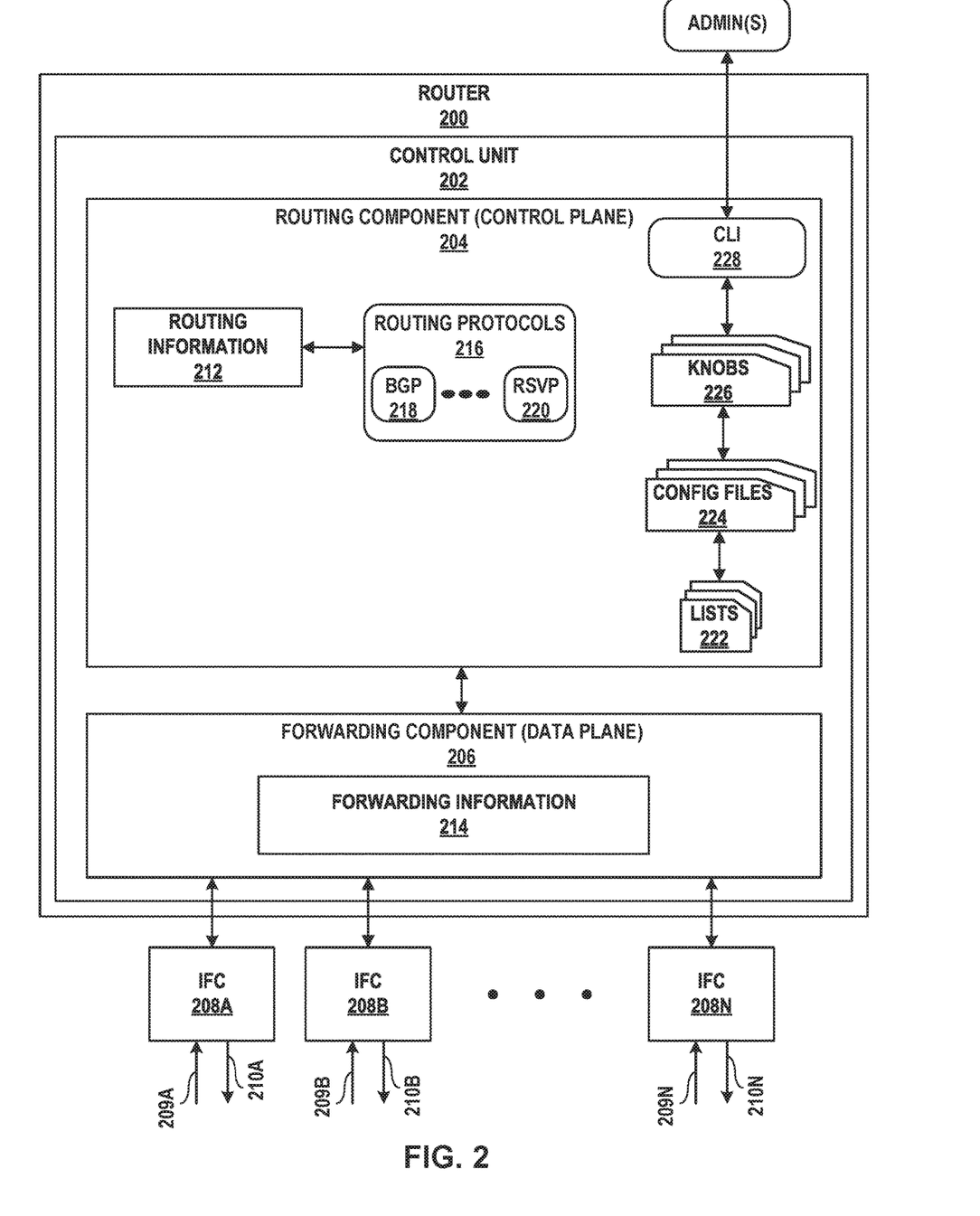
FIG. 2 is a block diagram illustrating an example network device that operates in accordance with various aspects of the techniques described in this disclosure.

FIG. 2 is a block diagram illustrating an example router 200 that performs various aspects of the techniques described in this disclosure. Router 200 may represent PE router 12B of FIG. 1, for example, or CE router 16A, as another example. While described with respect to router 200, the techniques may be implemented by any other type of network device capable of implementing at least routing protocols including a resource reservation protocol (RSVP) or border gateway protocol (BGP). Thus, while described with respect to router 200, the techniques should not be limited to router 200 described with respect to the example of FIG. 2.

In the example of FIG. 2, control unit 202 of router 200 includes routing component 204 (control plane) that configures and controls packet forwarding operations applied by packet forwarding component 206 (data plane). In general, router 200 may include control unit 202 that determines routes of received packets and forwards the packets accordingly via interface cards 208A-208N ("IFCs 208") that receive and send data units, such as packet flows, via network links 209A-209N and 210A-210N, respectively.

Router 200 may include a chassis (not shown) having a number of slots for receiving a set of cards, including IFCs 208. Each card may be inserted into a corresponding slot of the chassis for electrically coupling the card to routing component 204 via a high-speed switch (not shown), which may include, for example, a switch fabric, switchgear, a configurable network switch or hub, or other high-speed switching mechanisms. IFCs 208 may be coupled to network links 209A-209N and 210A-210N via a number of physical interface ports (not shown). Generally, IFCs 208 may each represent one or more network interfaces by which router 200 may interface with links of a network. The above-mentioned ports are configured to receive network cables to couple router 200 to other network devices that advertise routes according to a routing protocol.

Router 200 may include one or more hardware processors having dedicated hardware, such as one or more integrated circuits (ICs), one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. As used herein, a "processor" or "processing circuitry" may refer to one or more processing cores or a single CPU processor. Router 200 may include a main memory. Examples of memory include non-transitory computer-readable mediums including memory such as random-access memory (RAM) (including various forms of dynamic RAM (DRAM), e.g., DDR2 SDRAM and DDR3), or static RAM (SRAM), and Flash memory. A storage disk is a form of fixed or removable storage medium that can be used to carry or store desired program code and program data in the form of instructions or data structures and that can be accessed by a processor, or any other type of volatile or non-volatile memory that stores instructions to cause one or more cores to perform techniques described herein. Examples of storage device include a disk drive and/or an optical drive.

The above-mentioned hardware components provide a hardware operating environment for a control unit 202 that performs control plane and, in some cases, forwarding or data plane functionality for router 200. That is, in this example, control unit 202 is divided into two logical or physical "planes" to include a first control or routing plane ("control plane") and a second data or forwarding plane ("data plane"). That is, control unit 202 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane defines control plane functionality of router 200. The control plane manages and controls the behavior of the network, including the behavior of data plane. An operating system (not shown) of the control plane provides a run-time environment for multiple different processes each made up of one or more execution threads. The operating system may represent, for example, a UNIX operating system derivative such as Linux or Berkeley Software Distribution (BSD). The operating system may offer libraries and drivers by which processes may interact with data plane, for example, or other hardware of router 200, including a file system and main memory for router 200. Libraries and drivers of the operating system may include Application Programming Interfaces (APIs) that provide standard interfaces for developers to invoke the functionality of operating system and router 200 exposed by the libraries and drivers. The operating system may support multi-threading for multiple software execution threads. Although described with respect to router 200 that includes the data plane for forwarding packets in accordance with routing information 212 including received routes, the techniques of this disclosure are applicable to network devices, such as controllers and route reflectors, that perform control plane operations but may perform limited data plane operations with respect to forwarding packets in accordance with routing information 212 including received routes. In some cases, the control plane and data plane are not co-located within a single network device chassis but are distributed among multiple devices. For example, examples of router 200 that are controllers may perform the techniques described herein with respect to route processing and program, using software-defined network (SDN) techniques, one or more network nodes with forwarding information to implement the realize the routes within the network.

Control unit 202 is configured to execute routing protocols 216, which represents one or more computer processes for managing routing information of router 200 by, e.g., executing routing protocols to advertise and receive routes, processing received routes to resolve next hops, and in some cases generating forwarding information. In the example of router 200, forwarding information for router 200 is represented by forwarding information 214 of forwarding component (data plane) 206. Other operations performed by routing protocols 216 may include computing label-switched paths (LSPs), signaling LSPs using an LSP signaling protocol, managing routing instances, managing layer 2 and layer 3 virtual private networks, and managing multicast groups and computing multicast distribution trees for multicast traffic, for instance.

Routing component 204 provides an operating environment for various routing protocols 216 that execute at different layers of a network stack as routing protocol processes (RPPs). Routing protocols may operate at a network layer of the network stack and are typically implemented as executable software instructions. Routing component 204 is responsible for the maintenance of routing information 212 to reflect the current topology of a network and other network entities to which router 200 is connected. In particular, routing component 204 may use information received via one or more of the routing protocols to update routing information 212 to accurately reflect the network topology. Routing protocol messages are example messages for the communication sessions described herein. Based upon routing information 212, routing protocols 216 generate forwarding information 214 for storage in forwarding component 206.

In the example of FIG. 2, RPPs 216 may include BGP 218 to learn routes from peers and RSVP 220 to reserve resources at downstream routers for LSPs. When BGP 218 runs between two peers in the same autonomous system (AS), BGP 218 is referred to as Internal BGP (iBGP or Interior Border Gateway Protocol); in contrast, when BGP 218 runs between different autonomous systems, BGP 218 is called External BGP (eBGP or Exterior Border Gateway Protocol). The eBGP peers are typically connected directly, while the iBGP peers can be interconnected through other intermediate routers. RPPs 216 may include other routing protocols (not shown), such as routing information protocol (RIP), Intermediate System to Intermediate System (IS-IS), Open Shortest Path First (OSPF), or any other network protocols.

For RSVP-signaled LSPs, routing component 204 runs RSVP 220 to set up the paths and dynamically assign labels. A RSVP signaling session may involve configuring PE router 12B as an ingress router and communicating RSVP signaling messages (i.e., Path and Resv messages) between PE router 12B and egress routers that set up and maintain the RSVP-signaled LSP. An "ingress router" is a starting point for a given LSP. Any errors encountered while establishing an LSP are reported to PE router 12B for diagnostics. In some examples, the RSVP-signaled LSPs are constrained-path LSPs where intermediate hops of the LSP are computed using a constrained shortest path first (CSPF) algorithm. A constrained shortest path first (CSPF) computation accounts for information provided by the topology information from the IS-IS or OSPF link-state routing protocol, the current network resource utilization determined by RSVP, and the resource requirements and constraints of the LSP. Routing component 204 performs CSPF computations to determine a path that is a shortest path fulfilling a set of constraints. After pruning links that violate a given set of constraints, routing component 204 runs the CSPF algorithm and identifies the shortest path. A constraint could be minimum bandwidth required per link (also known as bandwidth guaranteed constraint), end-to-end delay, maximum number of links traversed, include/exclude nodes, and/or the like. To ensure a customer's SLA, routing component 204 runs the CSPF algorithm where at least some constraints are set to satisfy the customer's purchased network resource capacities (e.g., a minimum bandwidth).

Routing component 204, by executing the routing protocol processes (RPPs) 216, identifies existing routes through the network and determines new routes through the network. Routing component 204 stores routing information 212 that includes, for example, routes through the network (e.g., in routing tables). In some examples, routing information 212 includes RSVP LSP information. Forwarding component 206 stores forwarding information 214 that includes destinations of output links 210. Forwarding information 214 may be generated in accordance with routing information 212. In some examples, forwarding information 214 stores MPLS labels and associated next hops (e.g., in forwarding tables). Routing component 204 communicates with forwarding component 206 and programs forwarding information 214 based on routing information 212.

Admins may set priority values to control communication session reestablishment when needed such that sessions having a higher priority are reestablished over those of lower priority. To facilitate admin-priority value assignment, routing component 204 provides a number of knobs 226 which generally are user interface (UI) components. Each knob 226 may be specific to setting priorities for one communication session type. Routing component 204 generates a command line interface (CLI) 228 through which the admin enters commands and perceives output. To insert or adjust priorities in configuration files 224, the admins invoke respective ones of CLI knobs 226 by entering their representative command names into CLI 228. In other examples, a policy or a script is run to automatically set and later adjust the priorities in configuration files 224.

These communication sessions are to be reestablished by way of the prioritized session establishment techniques described herein. Configuration files 224 store priorities that determine an ordering at which these communication sessions are to be reestablished. These priorities may be defined in any level of granularity, such as a classification system (e.g., high, medium and low) or a numerical system having a range of values. In some examples, the stored priorities are numerical values (e.g., integers) within a certain range and those values may be found on a same line or a next line as the configuration statement indicating at least one parameter of a corresponding communication session, e.g., a BGP peer of a BGP peering session or an LSP of a RSVP-signaling sessions. Upon reestablishing the communication sessions, high priority customers have their sessions reestablished first, for example, to ensure a minimum level of service (quality) and/or avoid or at least mitigate any potential service disruption.

In one set of examples involving BGP 218, a first knob 226 may allow an admin to set a priority value for each BGP Peer of router 200 within each of a plurality of BGP groups or to set a priority value applicable to all BGP Peers of router 200 within a given one of the BGP groups. The first knob 226 may be configured to define priority values according to a numerical system where at least one threshold value distinguishes high priority BGP Peers from low priority BGP Peers of router 200. In one example, routing component 204 classifies, by default, all BGP Peers as medium priority with a pre-determined priority value and in response to admin invocations of the first knob 226, either increases or decreases (by a number) a BGP Peer's pre-determined medium priority value to upgrade or degrade that BGP Peer to high priority or low priority classification, respectively. The first knob 226 may store such an increase or decrease in a priority value parameter that is added to a configuration statement indicating the BGP Peer of a BPG peering session. Router 200 engages in prioritized establishment of BGP peering sessions in response to planned and unplanned events prompting reestablishment such as restarts or upgrades.

In the example of FIG. 2, configuration files 224 include information describing communication sessions that were previously established by router 200. An example configuration file 224 may include configuration statements that define such communication sessions in terms of one or more parameters. Routing component 204 may utilize parameters that uniquely identify the router 200's node attributes such as by identifying router 200's neighbors (e.g., internal and external BGP peers) and/or router 200's reserved routes (e.g., RSVP LSPs). An example configuration statement for a RSVP-signaling session may include a LSP name, address, etc. as defining parameters. An example configuration statement for a BGP peering session may include a BGP peer name, address, etc. as defining parameters.

In response to a restart or upgrade, routing component 204 parses the sessions in configuration order and sorts into lists 222 the BGP peers according to priority value. In one example, lists 222 includes a list of BGP peers having a highest priority, a list of BGP peers having a medium priority, and a list of BGP peers having a lowest priority. BGP 218 executes a computing job that processes the lists 222 in priority order by only establishing BGP peering sessions for BGP peers of highest priority and not initiating peering sessions for BGP peers of a lower priority until the peering sessions for BGP peers of highest priority are established.

In one set of examples involving RSVP 220, a second knob 226 may to allow an admin to set a priority value for each RSVP-signaled LSP for which router 200 is the ingress router. Similar to the examples for BGP 218, routing component 204 parses the RSVP signaling sessions in configuration order and sorts into lists 222 the RSVP signaling sessions according to a numerical system where at least one threshold value distinguishes high priority RSVP-signaled LSPs from low priority RSVP-signaled LSPs of router 200. In one example, routing component 204 classifies, by default, all RSVP-signaled LSPs as medium priority with a pre-determined priority value and in response to admin invocations of the second knob 226, either increases or decreases (by a number) a RSVP-signaled LSP's pre-determined medium priority value to upgrade or degrade that RSVP-signaled LSP to a high priority or a low priority classification, respectively. Router 200 is ready for prioritized establishment of RSVP signaling sessions in response to planned and unplanned events prompting reestablishment such as restarts or upgrades.

In one example, lists 222 includes a list of LSPs having a highest priority, a list of LSPs having a medium priority, and a list of LSPs having a lowest priority. Routing component 204 executes a computing job that processes lists 222 in priority order by only initiating RSVP signaling sessions for highest priority LSPs and not initiating RSVP-signaling sessions for LSPs of a lower priority until the sessions for highest priority LSPs are established. In one example, RSVP 220 suspends the computing job before processing the lists 222 until RSVP 220 completes a CSPF computation for the LSPs of highest priority. In this manner, routing component 204 ensures that the LSPs are established with the shortest constrained paths. When the CSPF computations finish, routing component 204 initiates the RSVP signaling sessions and only schedules the LSPs of medium priority when the high priority RSVP signaling sessions are completed.

Figure 3:
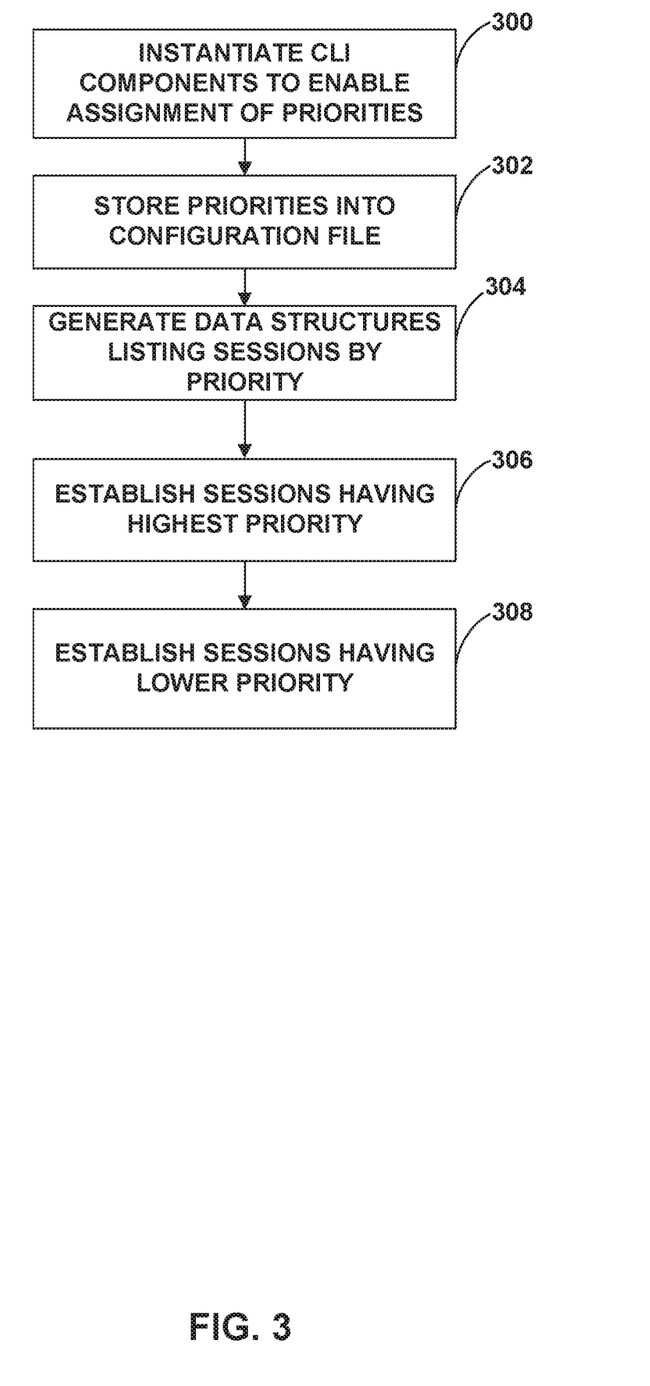
FIG. 3 is a flowchart illustrating operations in accordance with various aspects of the techniques described in this disclosure.

FIG. 3 is a flowchart illustrating example operations of a network device in accordance with various aspects of the techniques described in this disclosure. The example operations are described herein with respect to router 200 of FIG. 2. Similar operations may be performed by any of PE routers 12 or CE routers 16 of FIG. 1.

Router 200 instantiates CLI components known as knobs 226 to enable assignment of priorities to sessions defined in data files (e.g., configuration files such as configuration files 224 of FIG. 2) (300). In some examples, the CLI components enable the above-mentioned priority assignment by inserting a priority (e.g., a priority value) for a particular session or group of sessions into the configuration files 224. An admin may set a new priority value or upgrade/downgrade a session to/from a highest priority such as by incrementing/decrementing a previous priority value by an amount. In some examples, when a certain CLI component is invoked with (e.g., one or more command line arguments including) a priority value and a session parameter or attribute for searching configuration statements in the configuration files. By submitting the session parameter, such as a specific peer name or path name, and the priority value to the certain CLI component, router 200 responds by storing the priority value into one or more configuration statements of the configuration file 224 corresponding to a specific communication session or group of sessions for the specific peer name or path name (302). Therefore, the description provided in the one or more configuration statements define the specific communication session or group of sessions in terms of at least one parameter such as the specific peer name (e.g., a BGP peer name) or the specific path name (e.g., a RSVP-signaled LSP name).

Router 200 generates data structures listing sessions by priority (304). Each list is a data structure enumerating a number of sessions of a particular priority. In one example, router 200 generates a list of high priority BGP peers and/or a list of high priority RSVP-signaled LSPs. In another example, router 200 generates a list of low priority BGP peers and/or a list of low priority RSVP signaled LSPs. In yet another example, router 200 generates a list of medium priority BGP peers and/or a list of medium priority RSVP signaled LSPs and (possibly) lists of BGP peers and/or RSVP signaled LSPs for other priorities.

Router 200 accesses a list of sessions having a highest priority and establishes those sessions first (306). In one example, router 200 establishes a BGP peering session for each high priority BGP peer included in the above-mentioned list of high priority BGP peers. In one example of a BGP peering session for a high priority BGP peer, router 200 exchanges session messages (e.g., BGP_update messages) with that BGP peer (e.g., an internal BGP peer) and use those session messages to learn routes to destinations behind that BGP peer.

In another example, router 200 establishes a RSVP signaling session for each high priority LSP included in a list of high priority LSPs. In one example of a RSVP signaling session for a high priority LSP, router 200 is an ingress router and communicates with an egress router session messages reserving resources at the egress router and each intermediary router.

Once those sessions are established, router 200 proceeds to establish sessions having lower priority (308). In one example of a RSVP signaling session for a low priority LSP in a list of low priority LSPs, router 200 is an ingress router and communicates messages to an egress router in order to set up the low priority LSP. The low priority LSP may be a constrained path LSP requiring a CSPF computation prior to RSVP signaling. In one example of a BGP peering session for a low priority BGP peer, router 200 exchanges session messages (e.g., BGP_update messages) with that BGP peer and based upon those session messages, learns routes to destinations behind that BGP peer. In other examples, router 200 establishes sessions of an intermediary priority (e.g., medium priority) before establishing sessions of low priority.

Figure 4:
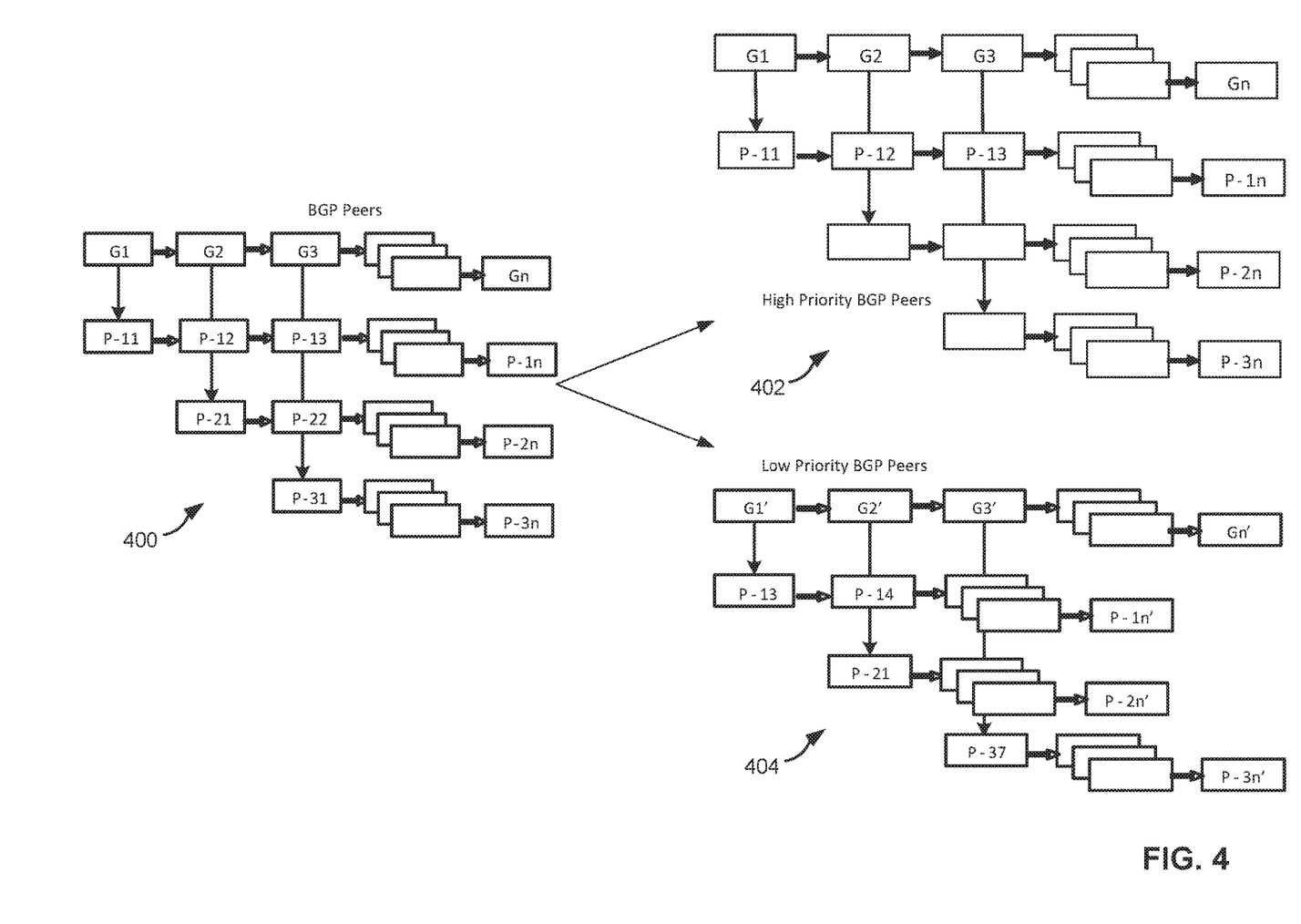
FIG. 4 is a conceptual diagram illustrating a prioritization scheme for establishing BGP peering sessions in accordance with various aspects of the techniques described in this disclosure.

FIG. 4 is a conceptual diagram illustrating a prioritization scheme for establishing BGP peers, in accordance with various aspects of the techniques described in this disclosure. A network device such as a router may perform prioritized BGP session establishment in accordance with the prioritized scheme of FIG. 4. The network device is part of a larger network, such as an enterprise network where customer sites are connected to each other through a Layer 2/Layer 3 Virtual Private Network (VPN). Customers receiving network services pay for varying levels of service from the network and the network device.

A configuration file, such as one of the configuration files 224 of FIG. 2, may store information describing BGP sessions, such as an enumeration of BGP peers 400 to the network device. As illustrated, BGP peers 400 are separated into groups "G1" through "Gn" of which each group includes a number of peers. As described herein, a specific CLI component known as a knob may be invoked by admins entering priority values to assign at least one of BGP peers 400. By default, BGP peers 400 are assigned a priority value corresponding to a middle priority classification or no classification (e.g., "0"). The network device, by the CLI component, receives a new priority value from an admin and stores the new priority value in the configuration file, which upgrades or downgrades a BGP peer 400 from a middle priority classification to a high priority classification or a low priority classification. As an example, an admin may enter a command setting priority values for peer "P-11" and peer "P-14" to a high priority value and a low priority value, respectively. To enable prioritized establishment of peer "P-11" over peer "P-14" during a restart for example, peer "P-11" and peer "P-14" are sorted into different lists.

The network device parses the above mentioned configuration file and generates first list 402 enumerating high priority BGP peers for BGP peering sessions and second list 404 enumerating low priority BGP peers for BGP peering sessions. Any number of data structures can be designed for first list 402 and second list 404. Each list 402, 404 of BGP peers may represent a specific portion of BGP peers 400. As described herein, the network device initiates BGP peering sessions for the high priority BGP peers before the low priority BGP peers. Initially, sessions are only initiated for the high priority BGP peers and when those sessions are finished, BGP sessions are initiated for low priority BGP peers. In one example, low priority BGP peers are removed from their original groups ("G1" to "Gn") and into new groups ("G1'" to "Gn'") in second list 404. As illustrated in FIG. 4, peer "P-11" remains in original group "G1" due to being a high priority BGP peer while peer "P-14" is moved to new group "G1'" due to being a low priority BGP peer. Because peering sessions for BGP peers in first list 402 are started first, a peering session is established for peer "P-11" before peer "P-14" to ensure that the peering session is not vulnerable to resource hogging, service disruption, traffic loss, etc.

The customer's network service may be vulnerable to resource hogging, traffic loss, and/or service disruption, if low priority BGP peers are established around a same time as the high priority BGP peers. The prioritized establishment scheme avoids/reduces the resource hogging, traffic loss, and/or service disruption caused by initiating an excessive number of sessions at the same time. In network devices having multi-threaded processors, a thread may be allocated for each BGP group having sessions to establish from list 402 such that each thread establishes a peering session for high priority BGP peers from a respective BGP group. List 402 and list 404 are handled separately while the BGP groups within the lists are handled in parallel.

In response to a graceful restart, current network devices establish peering sessions in configuration order and as such, eBGP Peering sessions may be initiated first to exchange routes with BGP Peers, causing device processor (e.g., CPU) usage to substantially increase (e.g., spike), for example, due to high update exchange/processing. The eBGP Peering sessions may cause a delay in iBGP Peering re-establishment. In this case, when the graceful restart period expires and stale routes are deleted, a majority of the stale routes may include those routes that were originally learnt via iBGP Peering. As a result, Layer 2/Layer 3 VPN services are impacted and a network churn leads to traffic loss. Until the network's core converges, eBGP peering sessions may be postponed. The prioritization scheme of FIG. 4 prevents or mitigates these issues by prioritizing establishment of high-priority BGP peering sessions (regardless of whether between iBGP peers or eBGP peers are high priority).

Figure 5:
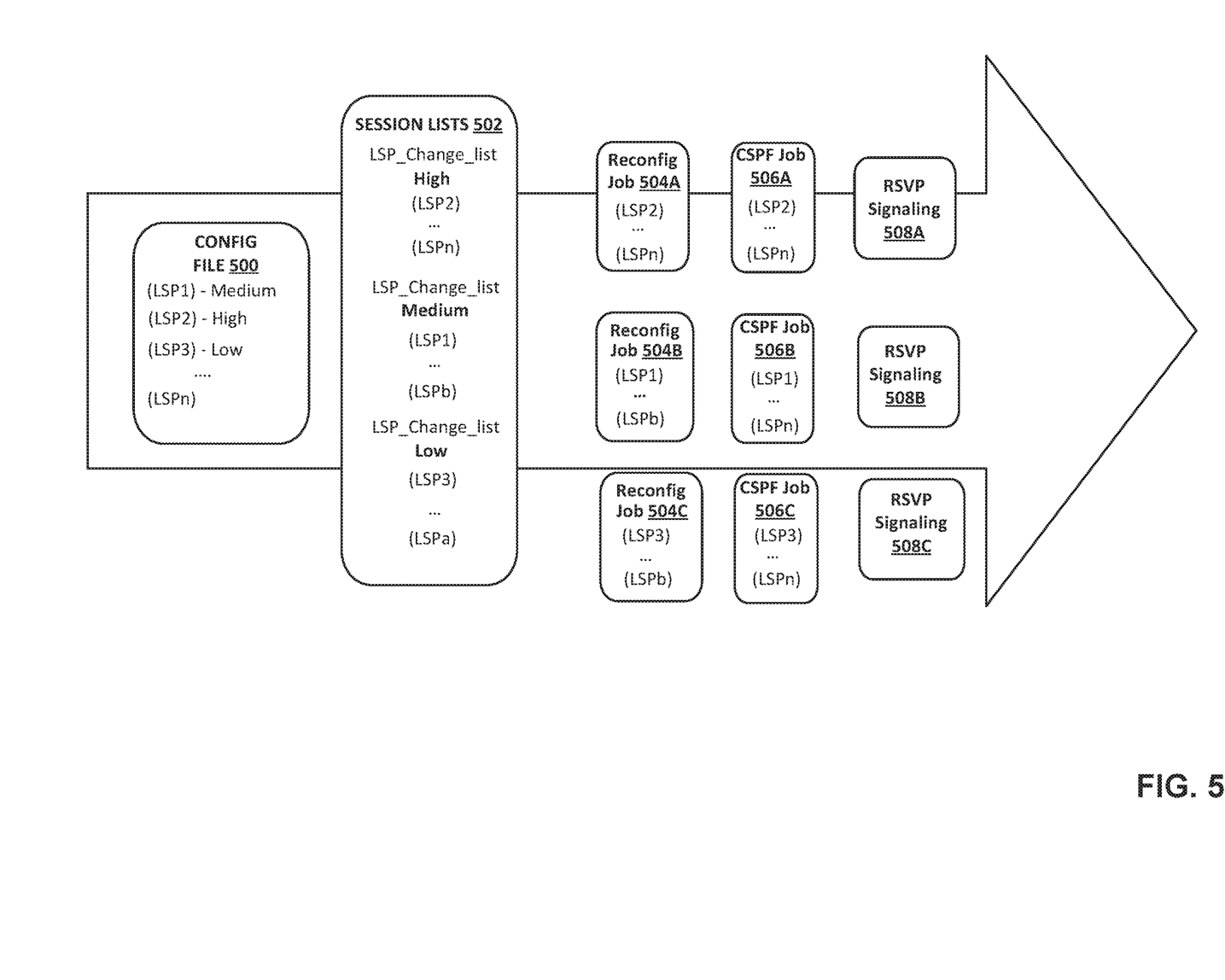
FIG. 5 is a conceptual diagram illustrating a prioritization scheme for establishing RSVP signaled paths, in accordance with various aspects of the techniques described in this disclosure.

FIG. 5 is a conceptual diagram illustrating a prioritization scheme for establishing RSVP signaled paths, in accordance with various aspects of the techniques described in this disclosure. A network device such as a router (e.g., router 200 of FIG. 2) may perform prioritized RSVP LSP establishment, in accordance with the prioritized scheme of FIG. 5, on LSPs provided in configuration file 500.

The network device parses information describing sessions stored in configuration file 500. In one example, the network device sorts LSPs according to priority (e.g., classifications such as High, Medium, or Low or numerical values such a positive integer between zero (0) and one hundred (100)). The network device may generate lists of RSVP signaled LSPs (or LSPs) where each list enumerates LSPs having a particular priority. These lists may be stored in session lists 502 and used by the network device in establishing RSVP LSPs. As illustrated, session lists 502 includes separate lists for high, medium, and low priority LSPs, and in that order, each of these lists undergoes reconfiguration or "reconfig" job 504. In one example, LSP_change_list for high priority LSPs includes at least LSP2 and LSPn and those LSPs are enqueued for CSPF job 506A after suspending reconfig job 504A. When CSPF job 506A completes computations on at least LSP2 and LSPn, the network device invokes RSVP signaling 508A to reestablish at least LSP2 and LSPn and reschedules reconfig job 504A.

After checking that the LSP_change_list is empty and the CSPF computations are done for all high priority LSPs, network device terminates reconfig job 504A and starts reconfig job 504B for LSP_Change_List for LSPs of medium priority. Similar to reconfig job 504A, reconfig job 504B is suspended in order to enqueue the LSPs of medium priority into CSPF job 506B. When the CSPF computations are finished, RSVP signaling 508B is initiated for the LSPs of medium priority, causing the suspension of reconfig job 504B to be lifted. After determining the LSP_Change_List for LSPs of medium priority is empty, reconfig job 504B is terminated and reconfig job 504C is started.

In a similar fashion, reconfig job 504C is suspended in order to enqueue the LSPs of low priority into CSPF job 506C. When the CSPF computations are finished, RSVP signaling 508C is initiated for the LSPs of low priority and suspension of reconfig job 504C is lifted by network device. When the RSVP signaling 508C finishes reserving resources at intermediate and egress routers, reconfig job 504C terminates.

In response to a graceful restart, current network devices perform LSP establishment in configuration order and as such, establishment of sessions of low priority LSPs may start before or at a same time as high priority LSPs, most likely resulting in service disruption for a high priority customer and possibly a low priority customer. In some instances, low priority LSPs are pre-empted by high priority LSPs, further disrupting customer network service and (possibly) causing additional problems such as when the current network device sets up the pre-empted low priority LSPs via an alternate path. In addition, because of bandwidth restrictions caused by setting up the low priority LSPs, the reservations for the high priority LSPs cannot be satisfied. The prioritization scheme of FIG. 5 prevents or mitigates these issues by prioritizing establishment of high priority RSVP-signaled LSPs peers over lower priority LSPs. This prioritization scheme may improve network convergence time.

FIG. 4 and FIG. 5 above illustrate prioritization schemes for establishment of RSVP signaled LSPs and BGP peers (e.g., iBGP peers). These prioritization schemes, with little or no adaption, can be applied to communication sessions of other protocols. BGP peering sessions and RSVP-signaling sessions are only examples of applicable communication sessions. Network device software/hardware components comply with a wide range of technical configurations and protocols, and for at least that reason, enable prioritization schemes for a substantial number of protocols. Network devices implementing the techniques described herein are not limited to any particular session type or protocol. Other applicable protocols may include Open Shortest Path First (OSPF), Intermediate System-Intermediate System (ISIS), Label Distribution Protocol (LDP), Protocol-Independent Multicast (PIM), and/or the like.

The invention claimed is:

1. A method comprising:
   parsing, by a network device, a configuration file defining a plurality of communication sessions of a routing protocol and including priority values assigned to the communication sessions, wherein the plurality of communication sessions comprises a plurality of protocol sessions, wherein the configuration file defines each protocol session of the plurality of protocol sessions with one or more configuration statements indicating a priority value of the corresponding protocol session and at least one of a neighbor network device of the network device for the corresponding protocol session or a reserved route of the network device for the corresponding protocol session;
   creating, by the network device, two or more lists of protocol sessions for two or more of the priority values based on the configuration file, wherein each list of the two or more lists is created for a particular priority value of the priority values and defines one or more protocol sessions of the plurality of protocol sessions that are assigned the particular priority value; and
   establishing, by the network device, the one or more protocol sessions defined in each list of the two or more lists according to an ordering based on the priority values associated with the two or more lists.

2. The method of claim 1, wherein the routing protocol comprises one of a border gateway protocol (BGP) or a resource reservation protocol (RSVP).

3. The method of claim 1 further comprising receiving, by a command line interface (CLI) component of the network device, the priority values for the plurality of protocol sessions and storing the priority values in configuration statements in the configuration file, wherein each configuration statement indicates at least one parameter of a corresponding protocol session.

4. The method of claim 1 wherein establishing, by the network device, the one or more protocol sessions further comprises creating a first list of the two or more lists from the protocol sessions defined in the configuration file, wherein the first list comprises an enumeration of protocol sessions corresponding to a first priority value, and establishing the protocol sessions corresponding to the first priority value before communication sessions corresponding to another priority value.

5. The method of claim 4 further comprising creating a second list of the two or more lists from the protocol sessions defined in the configuration file, wherein the second list comprises an enumeration of protocol sessions corresponding to a second priority value, and establishing the protocol sessions corresponding to the second priority value after the protocol sessions corresponding to the first priority value, wherein the second priority value indicates a lower priority than the first priority value.

6. The method of claim 1, wherein the plurality of communication sessions comprise a plurality of border gateway protocol (BGP) peering sessions, wherein the configuration file defines each BGP peering session of the plurality of BGP peering sessions with the one or more configuration statements indicating the neighbor network device of the network device as a BGP peer for the corresponding BGP peering session and a priority value of the corresponding BGP peering session, and wherein establishing, by the network device, the one or more protocol sessions further comprises:
   establishing a BGP peering session between the network device and each BGP peer included in a first list of the two or more lists, the first list indicating BGP peers having a first priority value; and
   establishing a BGP peering session between the network device and each BGP peer included in a second list of the two or more lists, the second list indicating BGP peers having a second priority value that indicates a lower priority than the first priority value.

7. The method of claim 1, wherein the plurality of communication sessions comprise a plurality of resource reservation protocol (RSVP)-signaling sessions, wherein the configuration file defines each RSVP-signaling session of the plurality of RSVP-signaling sessions with the one or more configuration statements indicating the reserved route of the network device as a label switched path (LSP) for the RSVP-signaling session and a priority value of the corresponding RSVP-signaling session, and wherein establishing, by the network device, the one or more protocol sessions further comprises:
   establishing a RSVP-signaling session for each LSP included in a first list of the two or more lists, the first list indicating LSPs having a first priority value; and
   establishing a RSVP-signaling session for each LSP included in a second list of the two or more lists, the second list indicating LSPs having a second priority value that indicates a lower priority than the first priority value.

8. The method of claim 7, wherein a first process performs the establishing of the RSVP-signaling session for each LSP included in the first list and a second process performs the establishing of the RSVP-signaling session for each LSP included in the second list, wherein establishing, by the network device, the one or more communication sessions further comprises:
   suspending the first process until a constrained shortest path first (CSPF) computation for each LSP included in the first list is completed; and
   starting the second process when the first process is completed.

9. A network device comprising:
   processing circuitry configured to:
      parse a configuration file defining a plurality of communication sessions of a routing protocol and including priority values assigned to the communication sessions wherein the plurality of communication sessions comprises a plurality of protocol sessions, wherein the configuration file defines each of the plurality of protocol sessions with one or more configuration statements indicating a priority value of the corresponding protocol session and at least one of a neighbor network device of the network device for the corresponding protocol session or a reserved route of the network device for the corresponding protocol session;

create two or more lists of protocol sessions for two or more of the priority values based on the configuration file, wherein each list of the two or more lists is created for a particular priority value of the priority values and defines one or more protocol sessions of the plurality of protocol sessions that are assigned the particular priority value; and establish the one or more protocol sessions defined in each list of the two or more lists according to an ordering based on the priority values associated with the two or more lists.

10. The network device of claim 9, wherein the routing protocol comprises one of a border gateway protocol (BGP) or a resource reservation protocol (RSVP).

11. The network device of claim 9, wherein the processing circuitry is further configured to instantiate command line interface (CLI) components configured to receive and store the priority values for the protocol sessions in configuration statements in the configuration file, wherein each configuration statement indicates at least one parameter of a corresponding protocol session.

12. The network device of claim 9, wherein the processing circuitry is further configured to create a first list of the two or more lists from the protocol sessions in the configuration file, wherein the first list comprises an enumeration of protocol sessions corresponding to a first priority value, and establish the protocol sessions corresponding to the first priority value before protocol sessions corresponding to another priority value.

13. The network device of claim 12, wherein the processing circuitry is further configured to create a second list of the two or more lists from the protocol sessions defined in the configuration file, wherein the second list comprises an enumeration of protocol sessions corresponding to a second priority value, and establish the protocol sessions corresponding to the second priority value after the protocol sessions corresponding to the first priority value, wherein the second priority value indicates a lower priority than the first priority value.

14. The network device of claim 9, wherein the plurality of communication sessions comprise a plurality of border gateway protocol (BGP) peering sessions, wherein the configuration file defines each of the plurality of BGP peering sessions with one or more configuration statements indicating the neighbor network device of the network device as a BGP peer for the corresponding BGP peering session and a priority value of the corresponding BGP peering session, and wherein the processing circuitry is further configured to establish a BGP peering session between the network device and each BGP peer included in a first list of the two or more lists, the first list indicating BGP peers having a first priority value; and establish a BGP peering session between the network device and each BGP peer included in a second list of the two or more lists, the second list indicating BGP peers having a second priority value that indicates a lower priority than the first priority value.

15. The network device of claim 9, wherein the plurality of communication sessions comprise a plurality of resource reservation protocol (RSVP)-signaling sessions, wherein the configuration file defines each of the plurality of RSVP-signaling sessions with one or more configuration statements indicating the reserved route of the network device as a label switched path (LSP) for the corresponding RSVP-signaling session and a priority value of the corresponding RSVP-signaling session and wherein the processing circuitry is further configured to establish a RSVP-signaling session for each LSP included in a first list of the two or more lists, the first list indicating LSPs having a first priority value; and establish a RSVP-signaling session for each LSP included in a second list of the two or more lists, the first list defining LSPs having a second priority value that indicates a lower priority than the first priority value.

16. A non-transitory computer-readable medium comprising instructions for causing a programmable processor to:

parse a configuration file defining a plurality of communication sessions of a routing protocol and including priority values assigned to the communication sessions, wherein the plurality of communication sessions comprises a plurality of protocol sessions, wherein the configuration file defines each of the plurality of protocol sessions with one or more configuration statements indicating a priority value of the corresponding protocol session and at least one of a neighbor network device of the network device for the corresponding protocol session or a reserved route of the network device for the corresponding protocol session;

create two or more lists of protocol sessions for two or more of the priority values based on the configuration file, wherein each list of the two or more lists is created for a particular priority value of the priority values and defines one or more protocol sessions of the plurality of protocol sessions that are assigned the particular priority value; and establish the one or more protocol sessions defined in each list of the two or more lists according to an ordering based on the priority values associated with the two or more lists.

17. The non-transitory computer-readable medium of claim 16, wherein the instructions cause the processor to:

establish a BGP peering session for each high priority BGP peer included in a first list of the two or more lists, the first list defining BGP peers having at least one first priority value; and establish a BGP peering session for each low priority BGP peer included in a second list of the two or more lists, the first list defining BGP peers having at least one second priority value.

18. The non-transitory computer-readable medium of claim 16, wherein the instructions cause the processor to:

establish a RSVP-signaling session each LSP included in a first list of the two or more lists, the first list defining LSPs having a first priority value; and establishing a RSVP-signaling session for each LSP included in a second list of the two or more lists, the second list defining LSPs having a second priority value that indicates a lower priority than the first priority value.

19. The non-transitory computer-readable medium of claim 16, wherein the instructions cause the processor to:

create a first list of the two or more lists from the plurality of protocol sessions in the configuration file, wherein the first list comprises an enumeration of protocol sessions corresponding to a first priority value, and establish the protocol sessions corresponding to the first priority value before communication sessions corresponding to another priority value.

20. The non-transitory computer-readable medium of claim 19, wherein the instructions cause the processor to:

create a second list of the two or more lists from the plurality of protocol sessions defined in the configuration file, wherein the second list comprises an enumeration of protocol sessions corresponding to a second priority value, and establish the protocol sessions corresponding to the second priority value after the protocol sessions corresponding to the first priority value, wherein the second priority value indicates a lower priority than the first priority value.

\* \* \* \* \*